United States Patent
Eldreth

(12)
(10) Patent No.: US 6,721,795 B1
(45) Date of Patent: Apr. 13, 2004

(54) DATA TRANSFER SERVER

(75) Inventor: Paul Eldreth, Chantilly, VA (US)

(73) Assignee: America Online, Inc., Dulles, VA (US)

(*) Notice: Subject to any disclaimer, the term of this patent is extended or adjusted under 35 U.S.C. 154(b) by 0 days.

(21) Appl. No.: 09/299,164

(22) Filed: Apr. 26, 1999

(51) Int. Cl.[7] .............................................. G06F 15/16
(52) U.S. Cl. ...................... 709/232; 701/201; 701/203; 701/217; 701/219; 701/236; 707/10; 370/469
(58) Field of Search ................................ 709/201–203, 709/217–232, 236; 707/10; 370/469

(56) References Cited

U.S. PATENT DOCUMENTS

| | | | |
|---|---|---|---|
| 5,619,709 A | | 4/1997 | Caid et al. |
| 5,708,834 A | * | 1/1998 | Sasaki et al. ............... 709/203 |
| 5,948,061 A | * | 9/1999 | Merriman .................... 709/219 |
| 6,009,410 A | * | 12/1999 | LeMole et al. ............... 705/14 |
| 6,047,327 A | * | 4/2000 | Tso et al. .................... 709/232 |
| 6,115,393 A | * | 9/2000 | Engel et al. ................. 370/469 |
| 6,161,137 A | * | 12/2000 | Ogdon et al. ............... 709/224 |
| 6,188,398 B1 | * | 2/2001 | Collins-Rector et al. ...... 725/37 |
| 6,216,129 B1 | * | 4/2001 | Eldering ...................... 707/10 |
| 6,311,206 B1 | * | 10/2001 | Malkin et al. ............... 709/202 |

OTHER PUBLICATIONS

"ISP Profile: Here's Something For Nothing From NetZero", Philips Business Information, vol. 4, Issue 44, Nov. 11, 1998.*

"Netgravity: Netgravity and Pathfinder are first to adopt Unicast's interstitial ads in pop–up windows", from Gale Group, Jun. 10, 1998.*

"Delivering on the ROI Promise"; Aptex Software; Nov. 6, 1997; pp. 1–15.

Aptex Software—The Content Mining Company; Aptex Software Inc. About Aptex Technology; Feb. 12, 1999; pp. 1–9.

* cited by examiner

Primary Examiner—Zarni Maung
Assistant Examiner—Jinsong Hu
(74) Attorney, Agent, or Firm—Fish & Richardson P.C.

(57) ABSTRACT

A computer-implemented information transfer method includes receiving a trigger message at a server, evaluating a selection rule to select a data flow to be presented to a user at an access device, and sending the data flow to an access device for pop-up presentation in response to the trigger. A server includes a database, a network interface, and a processor. The database includes a number of selection rules. Each selection rule includes instructions to select a data flow. The processor is operatively coupled to the network interface, the database, and the memory.

36 Claims, 3 Drawing Sheets

DATA TRANSFER SERVER

BACKGROUND

On-line service providers (OSPs), such as America Online, Inc., CompuServe, and various Internet world wide web site operators, provide users at client computers with various resources including electronic mail, chat, news, financial information, travel planning information, local weather information, and other information.

FIG. 1 shows a network 100 that includes OSP servers 111–116 as well as client computers 131–133. Each client computer 131–133 may execute a browser or other software application that allows a user to select information for retrieval from the servers 111–116 and which presents retrieved information to the user. The browser may display hypertext links, menus, dialog boxes, or other graphical user interface (GUI) control objects, may accept keyboard entry, or may have other input mechanisms that allow a user to select the desired information. When the user selects the information that he or she wants to receive, control data is sent from the browser application to an OSP server and, in response, the server sends the selected information to the user.

Data may be exchanged between browsers at client computers 131–133 and servers 111–116 over data paths that include access connections 134–136, a point of presence (POP) 130, and network 120. The POP 130 includes data communications equipment that enables and regulates communication between client computers 131–133 and the network 120. POP 130 may include dial-up modem banks, cable modem banks, wireless communications equipment, or other data transmission equipment. POP 130 also may implement security and authentication mechanisms to prevent unauthorized access to the network 120 or servers 111–116. For example, before granting a client computer 131–133 access to the network 120, the pop 130 may need to receive a valid user name and password from a client computer's user.

In addition to sending user-selected information to a client computer, an OSP may want to independently select information and send it to the user. For example, an OSP may want to send advertisements, information from business partners, service usage instructions, and other helpful information to a user. The OSP may want to present the information selected by the user ("user-selected" information), and the information selected by the OSP ("server-selected" information) using separate GUI windows. Separate presentation of user-selected and server-selected data may help to distinguish information selected by the user from that selected by the OSP.

To separate server-selected and user-selected data, user-selected data may be displayed in a main browser window and server-selected data may be displayed using a popup window (a "popup"). A popup is a GUI window that can be displayed by a browser in response to a host computer request. For example, when a user selects data using an America Online, Inc. (AOL) version 4.0 browser (an "AOL browser"), or using a hypertext transfer protocol-based browser (an "HTTP browser"), the user-selected data may be sent from a host computer to the browser and displayed in a main browser window. The host computer can also send instructions to the browser to display a popup window in which server-selected data can be presented to the user. The user may then be able to independently close, scroll, resize and otherwise interact with the main and popup browser windows.

Multiple logically interrelated data items can be received at a browser and displayed in a window. The display of interrelated data items can be simultaneous or sequential. For example, an OSP server may select a product advertisement that is to be displayed to a user in a popup window. The product advertisement can include a descriptive text file and a product picture that are simultaneously displayed to a user along with a product order GUI button. If the user selects the product order GUI button, the user's browser can send control data to an OSP server indicating that the button was selected. In response, the OSP server may send an order form to the client computer for display in the popup window. The displayed order form may replace or be appended to the previously displayed text, picture, and button information. Thus, the product advertisement selected by the OSP server includes descriptive text, a picture, and a GUI button that are simultaneously displayed to a user and an order form that is displayed sequentially following the selection of the GUI button. In the descriptions that follow, a collection of logically interrelated data items is referred to as a "data flow." Data flows can include server-selected data flows and user-selected data flows.

An OSP can pre-select server-selected data flow (and their sub-components). Pre-selection can be performed by statically associating particular server-selected data flows with particular user-selectable data flows. For example, an OSP can associate a car polish advertisement data flow with user-selectable information describing particular models of cars. When a user requests information about a particular model of car from an OSP server, the OSP server can send the requested car information for display in a main browser window and may send the associated car polish advertisement for display in a popup window. Server-selected data flows also may be randomly determined or selected using other mechanisms. For example, an OSP server can analyze text in user-selected data and attempt to determine topics of interest to that user. The OSP server may then select data flows based on the determined topics.

While existing mechanisms allow presentation of server-selected data flows, the present inventor recognizes the need for additional flexibility in selecting, arranging, structuring, and presenting such data flows. The present inventor also recognize a need for flexible gathering and application of statistical data related to data flows. For example, the present inventor recognizes that it may be desirable to alter the contents of a data flow depending on previously determined user's statistics, and it may be desirable to alter a selection of data items in the data flow based on a user's identity.

SUMMARY

In general, in one aspect, the invention features a computer-implemented information transfer method. The method includes evaluating a selection rule at a server to select a data flow and to determine contents of the data flow. The method also includes sending the contents of the data flow to another computer for presentation to a user.

Implementations may include one or more of the following features. A selection rule may include statements expressed in a programming language that includes Boolean logic, variable manipulation, and data access functionality. A statistical data set may be determined by the selection rule to identify statistical data that is gathered and stored as the data flow is presented to the user. The contents may be presented using a popup window at a client computer. The selection rule may be evaluated in response to a selection request received from another server. The selection rule may be evaluated in response to one of a number of different triggers that are associated with the state of the user, client computer, server computer, and/or other computers in a network.

In another aspect, the invention features a computer-readable medium. The medium includes instructions for causing a computer, i.e., server or client computer, to evaluate a selection rule to select a data flow and to determine contents of the data flow. The medium also includes instructions to send the contents of the data flow to another computer for presentation to a user. The medium may also include instructions to determine a statistical data set associated with the data flow based on an identity of the user and instructions to receive a selection request that includes the identity of the user from another server. One or more selection rules may be evaluated in response to the receipt of the selection request.

In general, in another aspect, the invention features a server that includes a database, a network interface, memory and a processor. The database includes a number of selection rules. Each selection includes instructions to determine the contents of a data flow associated with the selection rule. The processor is operatively coupled to the network interface, the database, and the memory. The memory includes executable instructions for causing the processor to evaluate a selection rule to select a data flow and to determine contents of the data flow. The memory may also include instructions for causing the processor to send information identifying the contents of the data flow to another computer for presentation of the contents to a user.

Implementations may provide one or more of the following advantages. The invention can be used to dynamically alter the contents of a data flow depending on previously determined data or dynamically determined data and on information associated with a particular user or groups of users. For example, the invention may be used to select items in a data flow based on a user's identity. The invention also may be used to dynamically customize sets of statistical information that are gathered when a data flow is presented to a user.

Other features, objects, and advantages of the invention will be apparent from the description and drawings, and from the claims.

DETAILED DESCRIPTION

Flexible selection, presentation, structuring of, and control over server-selected data flows can be achieved using a selection server. A selection server is a network element that can process rules ("selection rules") and make logical decisions used to affect selection, presentation, structure, and control over server-selected data flows. Selection rules can be used to make logical decisions based on statistical or historical information associated with a particular user or with a group of users, the user's identity, groups that the user is associated with, user profile information, and/or statistical data. Selection rules also can set control parameters that affect the gathering of data associated with a data flow, and can set control parameters that affect ways in which a user can interact with elements of a data flow.

Figure 1:
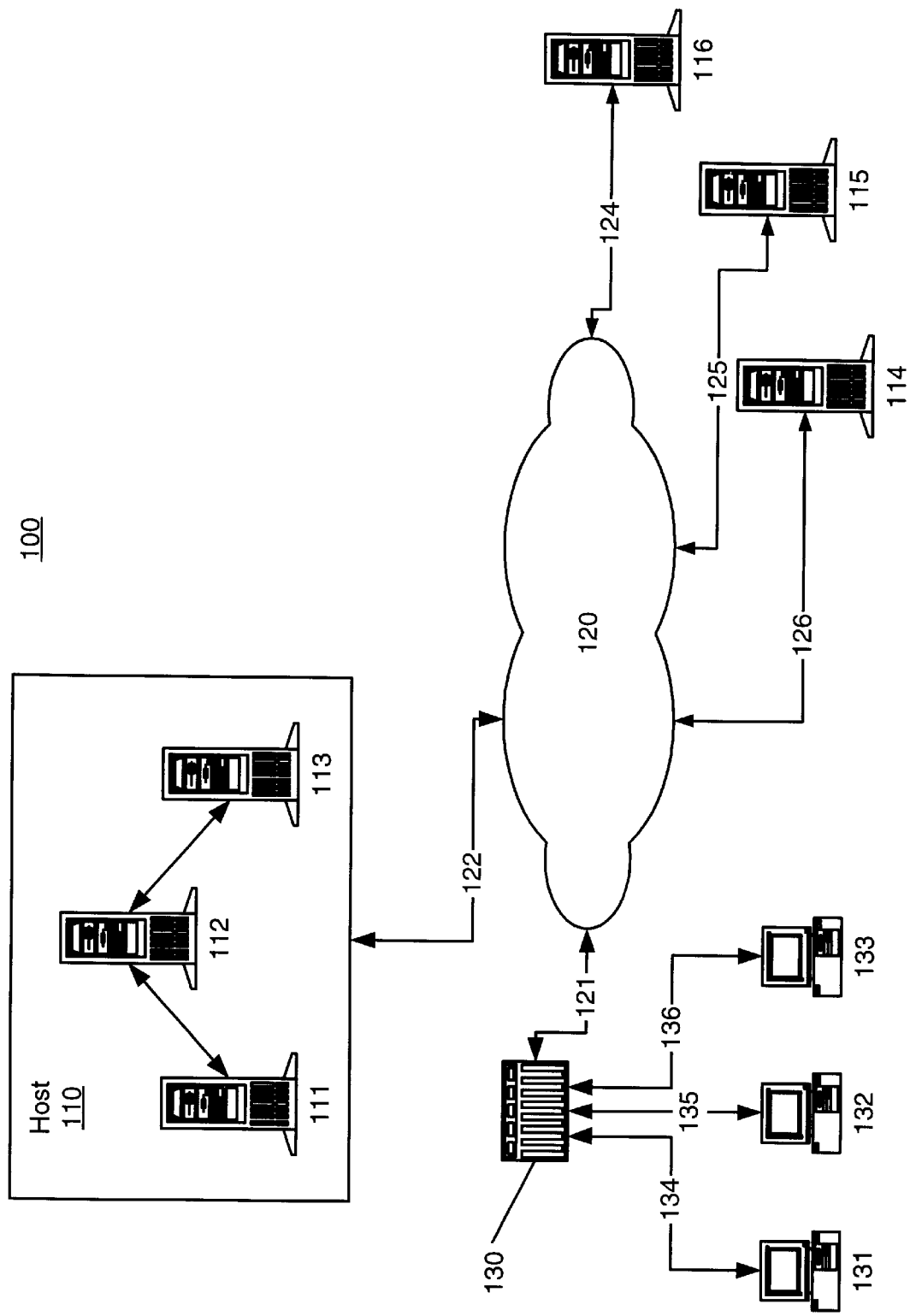
FIG. 1 shows an example of a prior art computer network.
Figure 2:
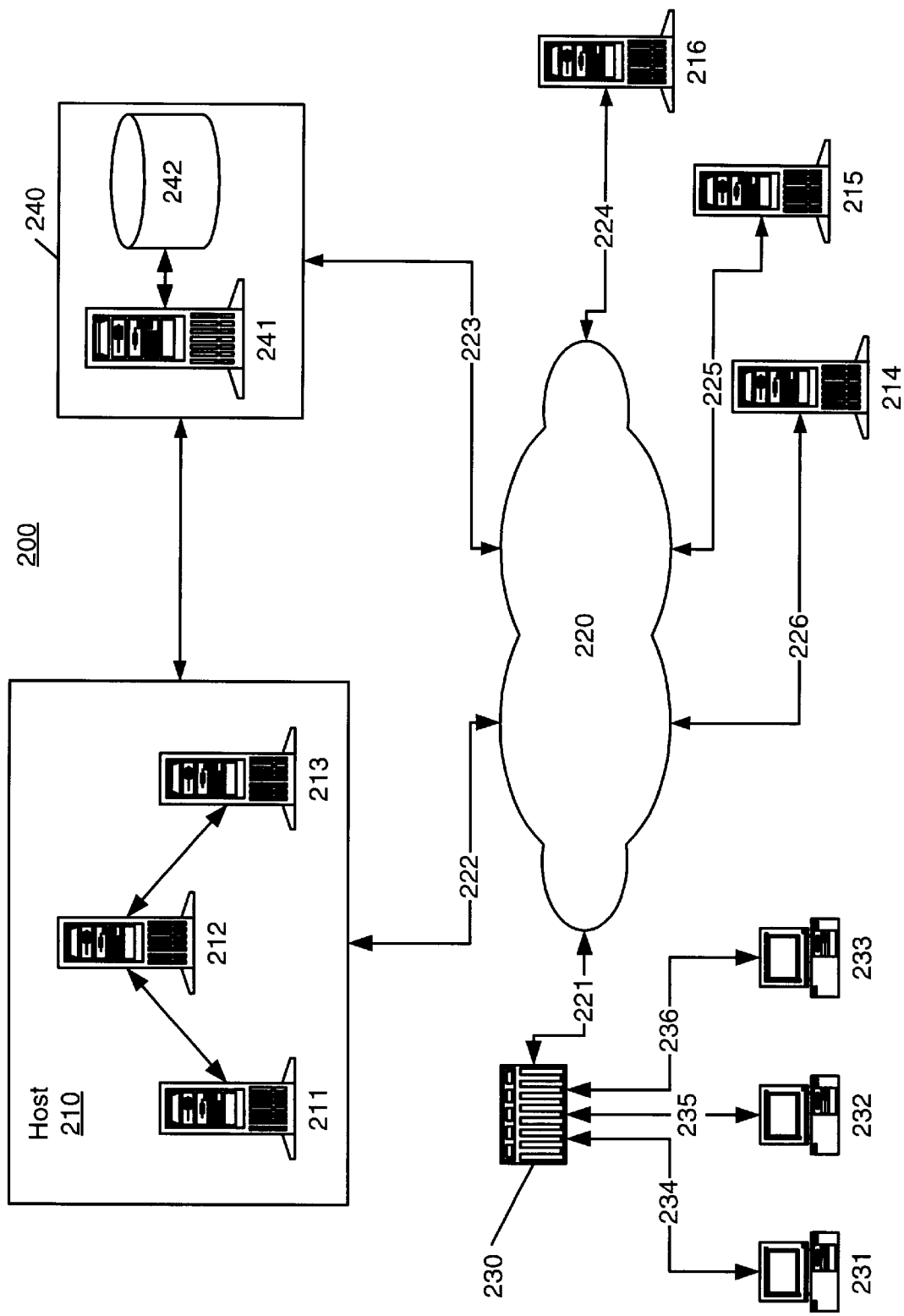
FIG. 2 shows an example of a computer network.

FIG. 2 shows a network 200 with a selection server 240. Users of client computers 231–233 can request data from information servers 211–216 using browser applications executed by the client computers. Data and data requests can be exchanged between the browser applications at the client computers 231–233 and the servers 211–216 over data paths that can include connections 234–236 to a network service provider's point of presence (POP) 230 and connections through an intermediate data routing network 220. The network 220 can be a private network, a public network, or a mix of private and public networks. For example, network 220 can include a private Internet Protocol network connected to the global Internet. Network 220 may interconnect servers operated by an single OSP or may interconnect servers and clients operated by different OSPs, individuals and organizations.

When a user is accessing the network 200, both user-selected and server-selected data can be sent to the user's browser. The transfer of user-selected data can be initiated by a user request sent from the browser to an information server 211–216. The transfer of server-selected data can be initiated when a trigger occurs. Triggers are browser and/or network processing states identifying points when server-selected data is to be transferred to a browser, and/or during which a browser will accept the transfer of server-selected data. For example, a browser may be able to accept server-selected data following the transfer of user-selected data. In such a browser, the request for user-selected data may be a trigger point for a subsequent transfer of server-selected data. The trigger points supported in a particular implementation can vary depending on the data transfer mechanism supported by browsers and servers in a network, the architecture of a particular network, and the needs of the implementation. In the exemplary implementation discussed here, the following six triggers points are supported:

1. Login Request Trigger

A login request trigger occurs when a user at a client computer 231–233 attempts to establish a data transfer connection with an OSP's access network. In the network 200, client computers 231–233 can connect to an OSP's access network at the OSP's point-of-presence (POP) 230. When a client computer connects to the POP 230, a login request trigger can occur. For example, in a modem-based implementation, a login request trigger can occur when at a client computer 231–233 establishes a data connection with POP 230 over a phone line and the POP requests user name and password data from the user. Login request triggers can also occur at other servers that implement login procedures. For example, if servers 211–216 implement their own login procedures, login request triggers may also occur when a user logs in to a server 211–216.

2. Login Granted Trigger

A login granted trigger occurs when a user's login information has been validated. For example, if the POP 230 determines that a user name and password provided during a login procedure are valid, a login granted trigger may occur.

3. Login Refused Trigger

A login refused trigger occurs when a user's login information has been rejected. For example, if the POP 230 determines that a user name and password provided during a login procedure are invalid, a login refused trigger may occur.

4. Service List Trigger

A service list trigger can occur when an OSP identifies available services to a user. For example, in an AOL implementation of network 200, after an AOL browser establishes a data connection with an AOL network, an AOL host system 210 (which may include multiple server sub components 211–213) may cause a list of available services to be displayed at the AOL browser. Upon displaying the list of available services, a service list trigger may occur. The service list trigger may be processed by the selection server 240 (using available selection rules) and may result in server-selected data being sent to the AOL browser for display in a popup window.

In some implementations, service list triggers may also occur upon selection of a particular service by a user. In such implementations, trigger messages sent to the selection server 240 may identify the particular service selected by the user.

5. User-selected Data Trigger

A user-selected data trigger can occur when a user identifies particular user-selected data that is to be retrieved from a server 211–216. For example, when a web browser makes a HTTP GET request to retrieve data from a server 211–216, a user-selected data trigger may be detected by the server 211–216.

6. Logout Request Trigger

A logout request trigger occurs when a user at a client computer 231–233 indicates that the data transfer connection between the client computer and an OSP's access network (or, in some implementations, a particular server 211–216) is to be ended.

Trigger Processing

Figure 3:
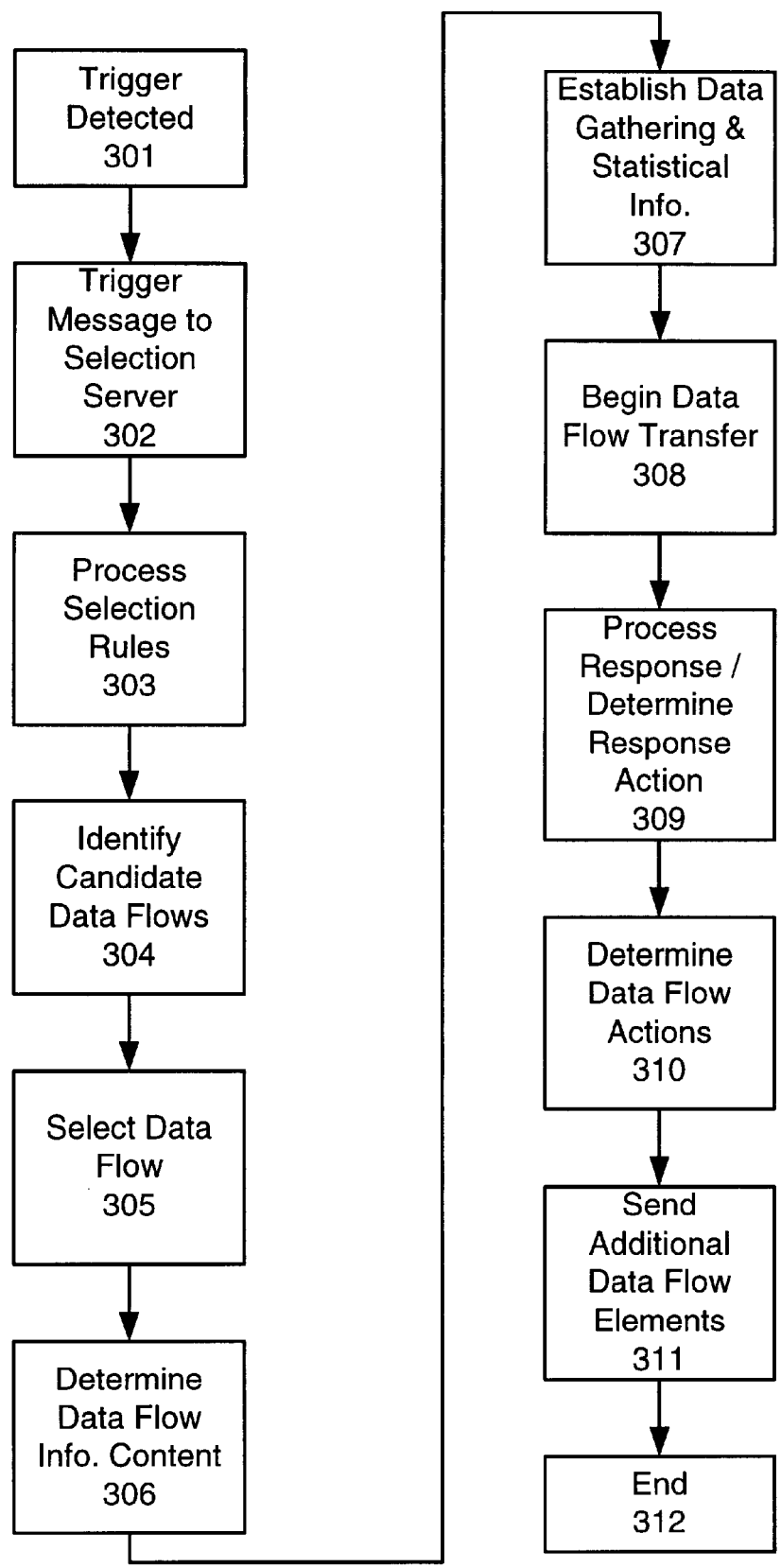
FIG. 3 is a flowchart showing selection rule processing and data flow transfer.

Triggers may be detected at information servers 211–216, POP 230, client computers 231–233, or other network 200 elements. Referring to FIGS. 2 and 3, when a trigger is detected, a trigger message is sent from the detecting network element to the selection server 240 indicating the type of trigger that has occurred (step 301–302). For example, a user's browser may be programmed to send user-selected data trigger messages to the selection server 240 whenever user-requested data is requested by the browser, or the user-requested data trigger message may be sent to the server 240 by an information server 211–216 when a data request is received by the information server from a browser.

In a HTTP-based implementation, trigger messages may be sent by HTTP browsers to the selections server 240 using uniform resource locators (URLs) specified in a HTTP GET request. For example, when user-requested data is transferred to a HTTP browser from an information server 211–216, the server 211–216 may send JavaScript® code to the browser to display a popup window and to send a HTTP GET request to the selection server 240. The HTTP GET request can include a URL specified by the information server as part of the JavaScript code. A URL can include data that is processed using common gateway interface (CGI) processing at the selection server 240 to determine the trigger. The selection server 240 may then select and return the server-selected data to the browser or may send a HTTP redirect command to the browser indicating the server 211–216 where the server-selected data is to be obtained.

In an AOL implementation, servers 211–213 may be sub-components of an AOL host system 210. A trigger may be detected by the AOL host 210 and trigger messages may be sent by the AOL host 210 to the selection server 240. The trigger message can be sent using a packet-based data transfer protocol to transfer a frame of data, or by using another data transfer protocol. In response, the selection server 210 may send a response message to the AOL host identifying the server-selected data to be sent from the host 210 to the AOL browser.

When a trigger message is received at the selection server 240, the selection server 240 processes selection rules stored in the database 242 to identify one or more candidate server-selected data flows that may be sent to a browser (step 303–304) (selection rules are further described below). In some implementations, the selection rules are partitioned into subsets and each subset is associated with a particular trigger. In such implementations, only those subsets associated with the trigger need to be processed. Each available data flow may be associated with a selection rule that evaluates to a Boolean 'true' value if the associated data flow is selected or to a Boolean 'false' if the data flow is not selected. If multiple candidate data flows are identified, the selection server 240 will then determine the server-selected data flow that is to be sent to a user's browser (step 305). Implementations may use a priority mechanism to resolve which data flow is to be selected from a set of candidate data flows. For example, each selectable data flow may have an associated priority value and the highest priority data flow in a set of candidate data flows may be chosen.

The selection server can also determine sub-components of a server-selected data flow (steps 306–307). In some implementations, a data flow's information content may be determined by selection rules associated with the data flow (step 306). For example, a data flow may be used to present an offer to purchase a flower arrangement and may include a picture showing the offered arrangement. The particular flowers within the arrangement may differ depending on a user's geographic location. Therefore, the picture accompanying the offer may differ depending on the user's geographic location. A selection rule associated with the offer may query the database 242 to retrieve a user's profile and to determine the user's geographic location. The selection rule may thereafter customize the flower offer data flow for the particular user by identifying a particular picture to be included in the data flow (step 306).

Statistical information can be associated with users and/or with particular data flows, can be stored in the database 242, and can be determined by a user's interactions with a particular data flow. The particular statistical information to be gathered may be determined by the selection rules (step 307). For example, selection rules can be used to store information in a user record indicating the number of times particular server-selected data flows have been presented to the user. Additionally, as a user interacts with a presented data flow (as is further described below), statistical information may be gathered and stored in the database 242. The statistical information may be stored, for example, on a per-user basis or based on a group that the user is associated with.

The server selected data flow may then be sent to the user (step 308). As previously explained, the data flow may be sent using the HTTP and JavaScript® programming language to pull server-selected information from servers in the network. Other browser technologies and data transfer mechanisms also may be supported. For example, "push" based data transfer technologies may allow a host system to send data and GUI control information to a browser without first requiring a request from a browser. Such a host based system may allow greater control over when server-selected data can be sent to the browser and may support a greater number of triggers than HTTP-based implementations. An AOL browser implementation is a type of "push"-based implementation.

A data flow may be sent to a browser as a collection of different segments. Segments may contain or be composed of various forms of data and control elements including informational data, pictures, GUI buttons, and response forms. Certain of these data flow segments, such as GUI buttons and response forms, may be used to interact with and gather information from a user. When a user interacts with a data flow segment, such as by selecting GUI buttons, entering data in forms, or otherwise generating responses, messages may be sent to the selection server 240 or information servers 211–216 reporting the user's interactions. The selection server 240 or information servers 211–216 may respond to such interaction messages by sending additional data flow elements or performing additional processing (steps 310–311).

Processing of user interaction and response data can include using selection rules to determine additional data flow segments to be sent to a user or to determine particular actions to be taken by the selection server 240. For example, a data flow may cause an advertisement to be presented to a user, and that user may respond by selecting a "purchase" GUI button. When the "purchase" GUI button is selected, a message can be sent to the selection server 240 to report the selection of the GUI button. As a result, the selection server 240 can process selection rules to complete a purchase by a user. Different actions can be taken by the selection server 240 depending on the selection rules, the user, and on information stored in the database 242. For example, some users may have billing method information already stored in the database 242 while other users may not. When the selection server 240 processed the "purchase" button selection method, selection rule processing may be used to query the database 242 and to determine additional data flow information to be sent to the user (step 311). The additional information may include, a billing information confirmation display (for users having billing information stored in the database 242), or a form to gather billing information (for those users not having billing information in the database 242).

Selection Rules

Selection rules can be implemented using a programming language that includes conventional programming language features such as the ability to define program variables, access global data, evaluate logic expressions, perform calculations, update local or global data and access local or remote databases. Suitable programming language include, among others, toolkit control language (TCL), Javascript, Visual Basic script (VB script), or 'C'. The selection rule language may include a set of pre-defined procedures ("base rules") that can be used within other selection rules. Base rules may include rules to process demographics information, rules to process account information, rules controlling the display of server-selected data in browser popups, and rules to access local or remote databases.

Selection rules can be implemented using rule segments that select and initialize data flows and separate rule segments that control the presentation of those data flows to a user and respond to user interactions. Each segment may affect the processing in other segments by, for example, setting variables or storing values in memory or databases accessible by the other segments. For example, an exemplary selection rule ("pop_53") is shown below. The "pop_53" selection rule includes a selection segment (shown as the procedure pop_53 expressed in pseudo-code form) and a control segment (shown as a table of ACTION statements labeled 1 through 4).

Referring back to step 304 of FIG. 3, the pop_53 selection segment (pseudo-code procedure) determines whether a data flow identified by the value '53' is a candidate data flow. The pop_53 procedure returns a Boolean 'true' value if the 'ID: 53' data flow is a candidate data flow, and a 'false' value otherwise.

The exemplary selection rule language used to implement 'pop_53' includes separate selection and control statements. The control statements are implemented as a table of ACTION statements (labeled 1 through 4). The ACTION statements identify selection server 240 processing that occurs when the 'ID: 53' data flow is to be sent to a user's browser and when the user interacts with the received data flow (e.g., during steps 307–311 of FIG. 3). Each ACTION statement includes four fields: a line number field, an operation field, a branch value field, and an arguments field. Values in the line number field are used to sequence the flow of ACTION statement processing. If a first ACTION statement identifies a line number in its branch value field, ACTION processing will continue with the identified ACTION line number after the first statement is processed. Thus, referring to the example below, ACTION statement 3 will be processed after ACTION statement 2. If a first ACTION statement does not identify a line number in the branch value field, ACTION processing may be suspended after the first ACTION statement is processed.

ACTION statements may also be processed by the selection server 240 based on a user's interaction with a presented data flow. For example, a popup displaying the 'ID:53' data flow may include two GUI buttons. When either of the GUI is selected by a user, an action request may be generated by the browser. An action request may be generated using a hypertext link invoking Common Gateway Interface (CGI) script processing at the selection server 240 or at another server 211–216 in the network 200. An action request may also be generated using other types of data sent directly to the selection server 240 or through another server 211–216 in the network 200. For example, an AOL browser generates an action request by sending data to a host system which, in turn, can forward a message to the selection server 240.

Example Popup Rule

Id: 53
Rule:

```
procedure pop_53 { } {
    Declare procedure variable pform;
    Identify global variables to be accessed;
    if (user="jones")
        then {
            access jones's data from database 242;
            perform calculations and set or alter variables
            (Variables can be set to alter presentation of
            the data flow and control over the data flow. For
            example, the variable 'pform' can be set to
            identify the first data item displaed to user 'jones'.
            Other variables can be set to identify statistics to be
            gathered. Different statistical sets can be chosen
            depending on the identity of the user);
            set or update persistent global variables associated
            with user 'jones'. Persistent variables exist from trigger
            to trigger;
            access selection server operating system procedure calls,
            if needed to perform processing;
            determine and return a 'true' or 'false' result;
            }
    else if (user = "smith")
        then {
            perform processing and set variables related to "smith"
            }
    else if (is_a_member(user, group ID))
        then {
            processing can be selected based on a user's membership
            in a particular group1 For example, processing may
            be determined by whether the user is a member
            of a group of users who have credit card accounts.
```

-continued

Example Popup Rule

```
        }
  end if
    }
}
```

| ACTION: | | | |
|---|---|---|---|
| Line # | Operation | Branch | Arguments |
| 1 | display_popup | — | $pform |
| 2 | count | 3 | user_counter |
| 3 | more_info | — | $mitag |
| 4 | close_form | — | |

Evaluation of the pop_53 selection rule by the selection server 240 determines whether the 'ID:53' data flow is to be presented to a user. If evaluation of the pop_53 rule results in a 'true' value, ACTION line 1 will be processed by the selection server 240. Processing of ACTION line 1 results in a 'display_popup' operation being performed. The 'display_popup' operation at line 1 determines the first segments that are to be sent in the data flow when the data flow is sent to a browser (refer back to step 308). Action line 1 specifies these segments using the variable 'pform.' The variable 'pform' may be set by the pop_53 selection rule based on processing of data in a trigger message received from a server, based on previously received selection status message data, and based on data stored in a database. The form of the variable 'pform' is implementation defined. In some implementations, variables such as 'pform' may include one or more URLs, database query identifiers, or other information that can serve as a pointer to server-selected data.

Since ACTION line 1 does not specify a branch value, ACTION statement processing is halted following the processing of ACTION line 1. ACTION processing may resume based on user-interaction with the displayed data segments identified by $pform. For example, the $pform segments may include a button which, when selected by a browser user, results in an action request being sent (directly or indirectly) to the selection server 240. The action request may indicate that ACTION statement 2 is to be processed. ACTION statement 2 indicates that a 'count' operation is to be performed. This may be used to gather statistical information and store it in the database 242. The count operation may increment a counter identified by the value 'user_counter.' ACTION processing may then branch to ACTION statement 3. Other ACTION statements may be processed in a similar manner.

Implementations need not use the table-based control data mechanism shown in the preceding pop_53 rule example. Other programming methodology, such as procedural programming methodologies, can be used to express control data functions. For example, control data may be specified in the form of control flowcharts created using a GUI-based authoring tool and stored in the database 242 as using a linked list data structures interconnecting flowchart elements.

In some implementations, the selection server 240 may fully or partially evaluate selection rules prior to the receipt of a trigger. This may reduce the time needed to process selection rules during a trigger event. For example, for each user, the selection server 240 may pre-evaluate the selection rules to identify the data flows that can be presented to that user. In general, full pre-evaluation of a selection rule is possible if the selection rule does not require dynamic data that is only made available when an associated trigger occurs. For example, if a particular selection rule depends on the time at which the trigger occurs, that rule cannot be fully evaluated until the trigger occurs. A selection server 240 can store a pre-evaluated selection of data flows on a per-user basis.

Selection server database 242 can be co-located with a selection server processor 241, or may be a remote database. For example, the database 242 can be implemented by one or more local or remotely located Oracle, Sybase, or Informix relational databases, or by another relational or non-relational database system. The database 242 may be accessed from selection rules using structured query language (SQL), open database connectivity (ODBC), or other database access mechanisms. In some implementations, elements of the database 242 may be stored at information servers 211–216. For example, an information server 211–216 may include a database that the selection server 240 is allowed to access.

Implementations may transfer data associated with a particular user to the selection server in trigger messages. For example, in an implementation in which trigger messages are sent from a host system 210 to the selection server, the host system can include information about the user (such as demographic information) in the trigger message.

The database 242 can contain user demographic information and information gathered during a user's current and/or previous on-line sessions. For example, the database 242 can include age, credit information, information services that the user subscribes to, address information, and other data associated with the user. The selection server 242 also may track and make selection decisions based on the number of times that particular server-selected data flows have been presented to a user or to members of a group of users, the elapsed time since a server-selected data flow was presented, and user-specific prioritization information.

Selection server implementations also may aggregate data associated with a group of users and perform logic and control processing based on the aggregated data.

The servers 211–216, clients 231–233, and selection server 240 may include Intel®x86 compatible personal computer, Apple Macintosh® computers, IBM, SUN, and HP computers, or other computer systems. Each computer includes hardware resources that may consist of a central processor, hard disk drive, RAM memory, backplane interconnections, data input peripherals such as a keyboard and mouse, output peripherals such as a video display driver card, and communication devices such as a modem and a network interface adapter. Each computer may also include an operating system and application programs. For example, the client computers 231–233 may execute a version of the Microsoft Windows® or Apple MacOS® operating system and may also include an AOL browser, a HTTP browser, or other browser application. Server computers 211–216 may execute the Microsoft Windows NT® or UNIX® operating system and may include software to respond to hypertext transfer protocol (HTTP), file transfer protocol (FTP), TCP/IP and/or other data exchange protocols.

Servers 211–216 may function as part of a logically unified host system that, from a user's perspective, appears as a single network system. For example, servers 211–213 are components of the host system 210. America Online, Inc. (AOL) operates a host system including multiple separate servers that can provide, among other things, electronic mail, chat, news, financial, travel, weather, and Internet gateway service to AOL users.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magneticdisks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. Accordingly, other embodiments are within the scope of the following claims.

What is claimed is:

1. A method for selecting a dataflow for transmission to a browser and responding to a user's interactions with the dataflow, the method comprising:
   storing a dataflow at a server;
   storing a selection rule at the server, wherein the selection rule includes:
      a selection segment defining conditions for selecting the dataflow to be sent to a browser at a client computer, wherein at least a portion of the dataflow includes several data items for display by the browser; and
      a control segment defining multiple, different types of actions associated with the dataflow;
   evaluating, at the server, the conditions defined by the selection segment to determine whether the dataflow is selected;
   receiving a trigger message at the server;
   in response to receiving the trigger message, sending the dataflow to a browser at a client computer when the dataflow is selected, wherein the data items are displayed by the browser;
   receiving an action request at the server from the browser, the action request indicating one of the multiple, different types of actions defined by the control segment, wherein the action indicated is based on a user's interaction with the displayed data items;
   selecting the action indicated in the received action request from the multiple, different types of actions defined by the control segment; and
   performing the selected action.

2. The method of claim 1 wherein the multiple different types of actions comprises sending a second dataflow to the browser.

3. The method of claim 1 wherein the multiple different types of actions comprises incrementing a counter.

4. The method of claim 1 wherein the multiple different types of actions comprises branching to a second action.

5. The method of claim 1 wherein the multiple different types of actions comprises collecting statistical information.

6. The method of claim 1 wherein the multiple different types of actions comprises storing statistical information in a database.

7. The method of claim 1 wherein evaluating the conditions of the selection segment comprises accessing statistical information.

8. The method of claim 7 wherein the statistical information comprises a number of times the web page has been sent to the computer for display to the user or an elapsed time since the web page was sent to the computer for display to the user.

9. The method of claim 1 wherein evaluating the conditions of the selection segment comprises accessing demographic information.

10. The method of claim 9 wherein the demographic information includes credit information, information services that a user subscribes to, or address information.

11. The method of claim 1 further comprising determining the identity of a user based on data received during a user login, wherein evaluating the conditions of the selection segment comprises accessing the identity of the user.

12. The method of claim 1 wherein the trigger message comprises one or more of a login request trigger message, a login granted trigger message, a login refused trigger message, a service list trigger message, a user selected data trigger message, or a logout trigger message.

13. A selection server comprising:
   a data store to store:
      a dataflow; and
      a selection rule, wherein the selection rule comprises:
         a selection segment defining conditions for selecting the dataflow to be sent to a browser at a client computer, wherein at least a portion of the dataflow includes several data items for display by the browser; and
         a control segment defining multiple, different types of actions associated with the dataflow;
   a memory comprising instructions for causing a processor to:
      evaluate the conditions defined by the selection segment to determine whether the dataflow is selected;
      receive a trigger message at the server;
      in response to receiving the trigger message, send the dataflow to a browser at a client computer when the dataflow is selected, wherein the data items are displayed by the browser;
      receive an action request at the server from the browser, the action request indicating one of the multiple, different types of actions defined by the control segment, wherein the action indicated is based on a user's interaction with the displayed data items;
      select the action indicated in the received action request from the multiple, different types of actions defined by the control segment; and
      perform the selected action; and
   a processor operatively coupled to the data store and the memory, the processor being structured and arranged to execute the instructions.

14. The selection server of claim 13 wherein the multiple different types of actions comprises sending a second dataflow to the browser.

15. The selection server of claim 13 wherein the multiple different types of actions comprises incrementing a counter.

16. The selection server of claim 13 wherein the multiple different types of actions comprises branching to a second action.

17. The selection server of claim 13 wherein the multiple different types of actions comprises collecting statistical information.

18. The selection server of claim 13 wherein the multiple different types of actions comprises storing statistical information in a database.

19. The selection server of claim 13 wherein, to evaluate the conditions of the selection segment, the memory further comprises instructions for causing a processor to access statistical information.

20. The selection server of claim 19 wherein the statistical information comprises a number of times the web page has been sent to the computer for display to the user or an elapsed time since the web page was sent to the computer for display to the user.

21. The selection server of claim 13 wherein, to evaluate the conditions of the selection segment, the memory further comprises instructions for causing a processor to access demographic information.

22. The selection server of claim 21 wherein the demographic information includes credit information, information services that a user subscribes to, or address information.

23. The selection server of claim 13 wherein the memory further comprises instructions for causing a processor to determine the identity of a user based on data received during a user login, and wherein, to evaluate the conditions of the selection segment, the memory further comprises instructions for causing a processor to access the identity of the user.

24. The method of claim 13 wherein the trigger message comprises one or more of a login request trigger message, a login granted trigger message, a login refused trigger message, a service list trigger message, a user selected data trigger message, or a logout trigger message.

25. An apparatus for selecting a dataflow for transmission to a browser and responding to a user's interactions with the dataflow, the apparatus comprising:
   means for storing a dataflow at a server;
   means for storing a selection rule at the server, wherein the selection rule includes:
      a selection segment defining conditions for selecting the dataflow to be sent to a browser at a client computer, wherein at least a portion of the dataflow includes several data items for display by the browser; and
      a control segment defining multiple, different types of actions associated with the dataflow;
   means for evaluating, at the server, the conditions defined by the selection segment to determine whether the dataflow is selected;
   means for receiving a trigger message at the server;
   means for sending the dataflow, in response to receiving the trigger message, to a browser at a client computer when the dataflow is selected, wherein the data items are displayed by the browser;
   means for receiving an action request at the server from the browser, the action request indicating one of the multiple, different types of actions defined by the control segment, wherein the action indicated is based on a user's interaction with the displayed data items;
   means for selecting the action indicated in the received action request from the multiple, different types of actions defined by the control segment; and
   means for performing the selected action.

26. The apparatus of claim 25 wherein the multiple different types of actions comprises sending a second dataflow to the browser.

27. The apparatus of claim 25 wherein the multiple different types of actions comprises incrementing a counter.

28. The apparatus of claim 25 wherein the multiple different types of actions comprises branching to a second action.

29. The apparatus of claim 25 wherein the multiple different types of actions comprises collecting statistical information.

30. The apparatus of claim 25 wherein the multiple different types of actions comprises storing statistical information in a database.

31. The apparatus of claim 25 wherein the means for evaluating the conditions of the selection segment comprises means for accessing statistical information.

32. The apparatus of claim 31 wherein the statistical information comprises a number of times the web page has been sent to the computer for display to the user or an elapsed time since the web page was sent to the computer for display to the user.

33. The apparatus of claim 25 wherein the means for evaluating the conditions of the selection segment comprises means for accessing demographic information.

34. The apparatus of claim 33 wherein the demographic information includes credit information, information services that a user subscribes to, or address information.

35. The apparatus of claim 25 further comprising means for determining the identity of a user based on data received during a user login, wherein the means for evaluating the conditions of the selection segment comprises means for accessing the identity of the user.

36. The apparatus of claim 25 wherein the trigger message comprises one or more of a login request trigger message, a login granted trigger message, a login refused trigger message, a service list trigger message, a user selected data trigger message, or a logout trigger message.

* * * * *